Jan. 4, 1927. 1,613,326
A. KREBS
WELDING APPARATUS
Filed April 2, 1923    2 Sheets-Sheet 1

Inventor
Adolf Krebs
by Roberts, Roberts & Cushman,
Attorneys

Jan. 4, 1927. 1,613,326
A. KREBS
WELDING APPARATUS
Filed April 2, 1923  2 Sheets-Sheet 2
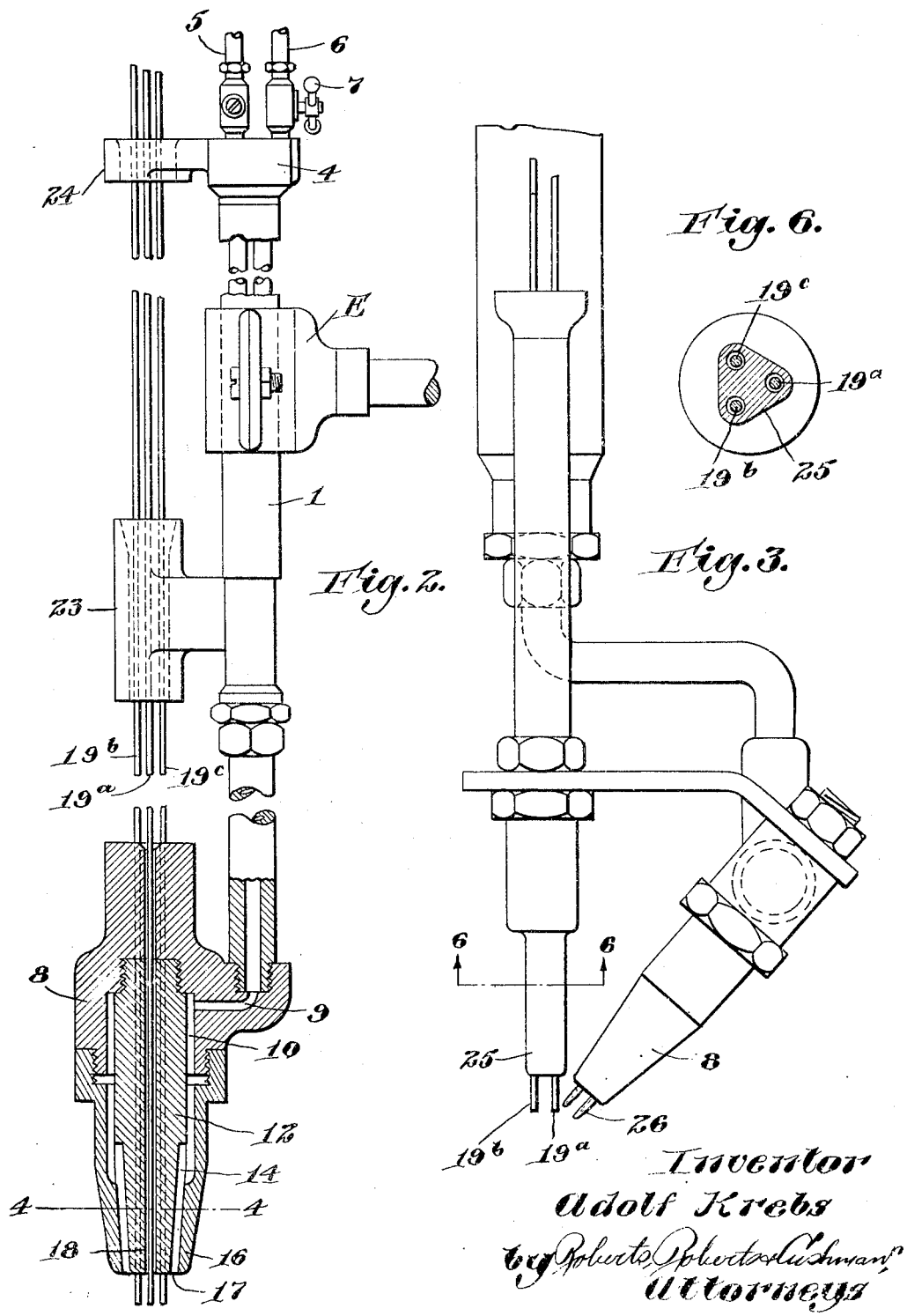

Patented Jan. 4, 1927.

1,613,326

UNITED STATES PATENT OFFICE.

ADOLF KREBS, OF BOSTON, MASSACHUSETTS.

WELDING APPARATUS.

Application filed April 2, 1923. Serial No. 629,367.

This invention relates to gas torch welding devices in which the welding material in the form of a wire or rod is fed to the stock to be welded as disclosed for example in my prior application Serial No. 567,882, filed June 13, 1922. In welding large stock where the seam to be welded has to be bevelled along the seam to about 45° on each side, the gap to be filled is both deep and wide; and to fill such a gap it has been customary to use a wire or rod of proportionally larger cross-section. When applied with a machine, this single rod had to be subjected to quite some heat in order to melt it freely and had to be spread by the machine over a considerable width proportional to the width of the seam.

It has been found by experiments that although a single rod of small cross-section may easily fill a gap of moderate width, a larger rod does not melt so easily in proportion to the maximum heat which can be safely applied without burning holes into the stock and that the rod may stick and the machine stop if less heat is applied. It is furthermore a fact that a flame having to heat a wide gap with a spiral movement as described in application No. 570,005, filed June 21, 1922 will lose much of its heating effect owing to the necessary wide swing of the movement.

I have discovered that these difficulties can be avoided by dividing the relatively large single rod into a plurality of small wires fed by gravity either through a multiple flame tip or in front of them. The aggregate cross-section of the multiple wires will then be commensurate with that of the otherwise necessary single rod.

Certain embodiments of this invention are illustrated in the drawings in which:

Fig. 2 is a view partly in elevation and partly in section of my torch welder;

Fig. 3 is a side elevation of a different form thereof;

Fig. 6 is a sectional view on the line 6—6 of Fig. 3.

Figure 1:
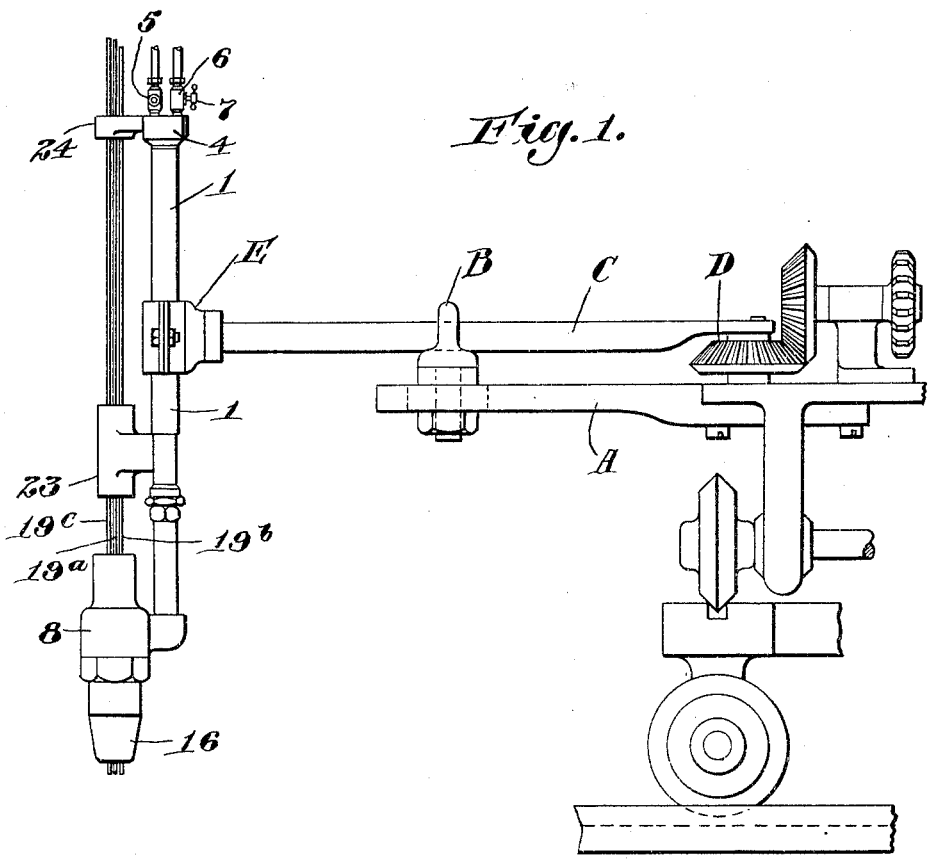
Fig. 1 is a side elevation of an automatic welding machine embodying my improvements.
Figure 4:
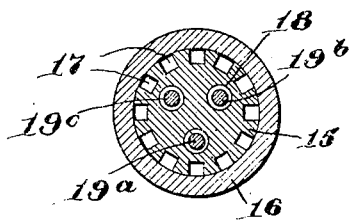
Fig. 4 is a sectional view as on the line 4—4 of Fig. 2.

The embodiment shown in Figs. 1 and 2 comprises a frame bearing a pivoted torch carrying arm suitably oscillated and having at its outer end a support for an offset torch head, the torch head being shown as of the gaseous fuel type having fuel outlet passages so arranged that the combustible gases will produce a substantially annular flame. The torch head is further provided with a plurality of apertures or passages so that a number of small wires or rods of welding stock may pass down through the torch head and within the area enclosed by the flames of the torch so that the flames will surround the lower ends of the rods shutting off access of air thereto and will heat the enclosed area of the weld and melt the lower ends of the several welding material supplies to most satisfactorily produce the weld. The invention further contemplates the arrangement of the several supplies of welding stock in such manner that certain of the wires or rods will feed welding material to the outer portion of the seam and thence inward toward the center, while additional portions will be fed directly to the central portion of the seam to additionally build up the seam at that point.

In the drawings A designates the frame of an automatic welding machine having the adjustable pivot or fulcrum B on which gyrates the torch carrying arm C. This arm is gyrated about its fulcrum by a suitably driven eccentric D at one end and at the opposite end has a head in the form of a clamp bracket E which engages the tubular casing 1 of the welding torch. This casing has at its upper end the socket or connection 4 to which are connected the pipes 5 and 6 for combustible gas and oxygen or other liquid or gaseous fuel supply controlled by the valve or valves 7. At the opposite end the casing supports an offset torch head 8 of the general type described in my aforesaid application 567,882. This torch head has an interior chamber 10 receiving combustible gas from the member 1 through the passage 9 and supports the nipple 12 within the chamber 10. Said nipple is formed at its lower end with grooves 14 separated by rib portions 15. These ribs in turn tightly fit the interior of the nozzle sleeve 16 which forms the outer wall or closure of the passages produced by the grooves 14, and at the same time positively and accurately center the nipple 12 relatively to the torch nozzle proper 16. The grooves or passages 14 thus form fuel outlets disposed in annular relationship to produce at the tip an annular heating and welding flame, which on account of the number of the grooves and the relatively small space occupied by the ribs 15 will be practically continuous or unbroken, thus enclosing the nipple and preventing access of air thereto. It will be understood that the nozzle might be produced by drilling the passages 14 in a solid tip in place of forming grooves with the enclosing nozzle portion.

Extending through the head 8 and nipple 12 and having no communication with the chamber 10 or passages 14 are the guide passages 18 to receive the welding material supply rods or wires which are shown as three in number ($19^a$, $19^b$, and $19^c$), the passages 18 being sufficiently larger in diameter than the rods 19 so that the weight of the rods will automatically feed them toward the work as their lower ends are melted away by the heat from the flame 17. Guides 23 and 24 carried by the member 1 are aligned with the passages 18 and loosely receive the entire group of bundle of welding supply rods and support them in proper position for this gravity feeding action.

Figure 5:
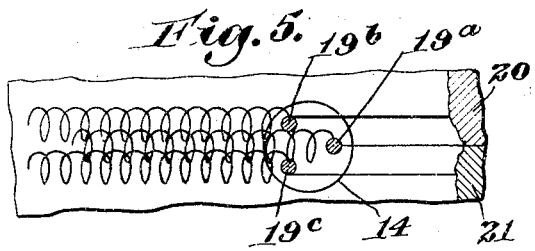
Fig. 5 is a diagrammatic view illustrating the operation of the improved automatic welder shown in Fig. 1.

One manner of operation of the invention is diagrammatically illustrated in Fig. 5, three wires being shown as here employed, but it will be understood that the particular number may be varied as desired and as found most expedient in any particular instance. As here illustrated the wire $19^a$ is centrally disposed and the wires $19^b$ and $19^c$ are at opposite sides thereof, all however being enclosed by the heating flames which for convenience have been illustrated by the annular ring 14. As the arm C gyrates and progresses along the seam the heat of the flames will melt the lower enclosed ends of the rods $19^a$, $19^b$ and $19^c$, the front part of the annular flame extending in advance of the rods and preheating the weld, especially at the central portion thereof. Melting of the rod $19^a$ will tend to fill up the seam at the central portion of the weld, the material spreading laterally according to the rapidity of melting and the amount of lateral movement imparted by gyration of the arm C. At the same time, the side portions of the flame will heat both sides of the seam and melt the rods $19^b$ and $19^c$ which move from edge to central portion of the seam following up and overlapping the material deposited by the rod $19^a$, and also carrying out the weld to the sides of the seam while the final or rear portion of the annular wall of flame serves to finally melt and cause proper flowing of the supplied stock to produce weld of most satisfactory appearance. At the same time the several rods by crossing over each other serve to stir in, or as it is sometimes termed "puddle", the entire weld, driving out any possible bubbles or the like and insuring most perfect union of the parts.

The invention so employed insures much easier and more satisfactory uniform melting of the supply of material welding stock and also better distribution of the stock centrally and laterally on account of the divided and spaced relationship of the several welding stock supplies, and also makes it possible to produce the weld with a much smaller movement of the heating flames than has hitherto been possible since each rod takes care of its own particular welding area, and more area of the seam is covered for the same movement of the welding supply stock, all of these features also resulting in economy as to amount of heating required, as well as securing a more perfect and more satisfactory completed weld.

Another form of the invention is illustrated in Figs. 3 and 6 in which the torch head 8 is shown as disposed forwardly and at an angle as respects the stock supply guide head 25, the head 8 directing a flame 26 diagonally toward the work, and welding supply rods 19 projecting from the lower end of the head 25 to properly heat both of the parts. The several rods as $19^a$, $19^b$ and $19^c$ in the head 25 may be arranged in either triangular or other configuration as may be found most expedient for the particular requirements of any special type of welding, the general operation being however preferably substantially that illustrated in Fig. 5.

I claim:

1. A welding device having juxtaposed parallel guides for feeding a plurality of fusible wires to the area to be welded and a heater for concomitantly fusing said wires at said area, said guides being spaced from each other and the wires being unattached to the guides, whereby to conduct the wires to said area independently of each other.

2. A welding torch having a nozzle portion, and having a plurality of independent guide passages formed therein to present a plurality of supplies of fusible material at the nozzle.

3. A device of the character described including a torch head having a nozzle portion, and a guide nipple contained within the head and nozzle portion and having a plurality of independent guide passages formed therein to present a plurality of supplies of fusible material at the nozzle, said nozzle being shaped to produce heating flames surrounding the termini of the supply passages.

4. A welding apparatus including means for producing a heating flame, and means for guiding a plurality of fusible wires to the flame in substantially parallel relationship to and independently of each other, said wires being of relatively small diameter.

5. A device of the character described including a main supporting portion, a torch head carried thereby and having a flame nozzle and a guide nipple within the nozzle, said torch head and nipple having a plurality of independent guide passages formed therein and terminating adjacent the discharge portion of the nozzle and within the area enclosed thereby.

6. A device of the character described including a main supporting portion, a torch head carried thereby having a flame nozzle and a guide nipple within the nozzle, said torch head and nipple having a plurality of independent guide passages formed therein terminating adjacent the discharge portion of the nozzle and within the area enclosed thereby, the support having guide sleeves aligned with the passages as an entirety for feeding fusible wires to said area.

7. Welding apparatus comprising a nozzle having an annular row of passages for supplying heat to the parts to be united and a plurality of guide passages for introducing a plurality of independent fusible wires within the area defined by said row.

8. Welding apparatus comprising an oscillating nozzle having an annular row of passages for supplying heat to the parts to be united and guide passages arranged in an annular row within said heat passages, and a plurality of small wires in said guide passages adapted to be fed by gravity and fused within the area defined by said heat passages.

Signed by me at Boston, Massachusetts this 9th day of March 1923.

ADOLF KREBS.